United States Patent
Wang et al.

(10) Patent No.: US 7,450,334 B1
(45) Date of Patent: Nov. 11, 2008

(54) DISK DRIVE ADJUSTING PREDICTIVE CACHING BASED ON TEMPERATURE OF VOICE COIL MOTOR

(75) Inventors: Zhi Wang, Irvine, CA (US); Kenny T. Coker, Corona, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/769,932

(22) Filed: Jun. 28, 2007

(51) Int. Cl.
*G11B 21/02* (2006.01)
*G06F 12/00* (2006.01)
*G11B 5/596* (2006.01)

(52) U.S. Cl. ......................... 360/75; 711/112
(58) Field of Classification Search ................. None
See application file for complete search history.

(56) References Cited

U.S. PATENT DOCUMENTS

| | | | |
|---|---|---|---|
| 4,249,172 A | 2/1981 | Watkins et al. |
| 5,119,250 A | 6/1992 | Green et al. |
| 5,146,578 A | 9/1992 | Zangenehpour |
| 5,182,684 A | 1/1993 | Thomas et al. |
| 5,268,804 A | 12/1993 | Wallis |
| 5,594,603 A | 1/1997 | Mori et al. |
| 5,657,179 A | 8/1997 | McKenzie |
| 5,793,558 A | 8/1998 | Codilian et al. |
| 5,966,726 A | 10/1999 | Sokolov |
| 6,038,096 A | 3/2000 | Zhang et al. |
| 6,115,205 A | 9/2000 | Waugh et al. |
| 6,163,430 A | 12/2000 | Hansen |
| 6,195,222 B1 | 2/2001 | Heminger et al. |
| 6,310,743 B1 | 10/2001 | Haines et al. |
| 6,339,811 B1 | 1/2002 | Gaertner et al. |
| 6,342,985 B1 | 1/2002 | Clare et al. |
| 6,369,972 B1 | 4/2002 | Codilian et al. |
| 6,418,510 B1 | 7/2002 | Lamberts |
| 6,445,531 B1 | 9/2002 | Gaertner et al. |
| 6,604,178 B1 | 8/2003 | Hall |
| 6,731,450 B1 | 5/2004 | Codilian et al. |
| 6,744,590 B2 | 6/2004 | Chu et al. |
| 6,754,035 B2 | 6/2004 | Francis et al. |
| 6,754,036 B2 | 6/2004 | Dehnert |
| 6,757,481 B1 | 6/2004 | Nazarian et al. |
| 6,775,100 B1 | 8/2004 | Belser et al. |
| 6,809,896 B2 | 10/2004 | Espeseth et al. |

(Continued)

OTHER PUBLICATIONS

Notice of Allowance dated Dec. 19, 2007 from U.S. Appl. No. 11/111,411, 8 pages.

(Continued)

*Primary Examiner*—Jason C Olson
(74) *Attorney, Agent, or Firm*—Howard H. Sheerin, Esq.

(57) ABSTRACT

A disk drive is disclosed including a disk having a plurality of tracks, wherein each track comprises a plurality of data sectors. The disk drive further comprises a head coupled to a distal end of an actuator arm, and a voice coil motor (VCM) comprising a voice coil for rotating the actuator arm about a pivot. A read command is selected from a command queue, wherein the read command comprises a requested data sector. A maximum number of additional data sectors is determined that may be cached together with the requested data sector. An actual number of additional data sectors to cache is selected in response to the maximum number and a temperature of the voice coil.

19 Claims, 6 Drawing Sheets

U.S. PATENT DOCUMENTS

| | | | |
|---|---|---|---|
| 6,826,630 B2 | 11/2004 | Olds et al. | |
| 6,877,070 B2 | 4/2005 | Espeseth et al. | |
| 6,925,539 B2 | 8/2005 | Mowery et al. | |
| 6,967,811 B1 | 11/2005 | Codilian et al. | |
| 6,968,423 B2 | 11/2005 | Coker et al. | |
| 6,987,639 B1 | 1/2006 | Yu | |
| 6,993,624 B2 * | 1/2006 | Hall | 711/112 |
| 6,995,946 B2 | 2/2006 | Ding et al. | |
| 7,061,714 B1 | 6/2006 | Yu | |
| 7,076,604 B1 | 7/2006 | Thelin | |
| 7,088,545 B1 * | 8/2006 | Singh et al. | 360/75 |
| 7,114,029 B1 * | 9/2006 | Thelin | 711/112 |
| 2002/0131195 A1 | 9/2002 | Dehnert | |
| 2003/0048571 A1 | 3/2003 | Soyama et al. | |
| 2003/0149837 A1 | 8/2003 | Coker et al. | |
| 2003/0149838 A1 | 8/2003 | Mowery et al. | |
| 2004/0233569 A1 | 11/2004 | Chung | |
| 2005/0086559 A1 | 4/2005 | Uysal et al. | |
| 2006/0007591 A1 | 1/2006 | Park et al. | |

OTHER PUBLICATIONS

"Optimal Seek-Speed versus Power Tradeoff in Disk File Systems", IBM Technical Disclosure Bulletin, Jun. 1995, vol. 38, Pub #6, pp. 323-324.

Office Action dated Jun. 6, 2007 from U.S. Appl. No. 11/111,411, 15 pages.

* cited by examiner

DISK DRIVE ADJUSTING PREDICTIVE CACHING BASED ON TEMPERATURE OF VOICE COIL MOTOR

CROSS REFERENCE TO RELATED PATENT APPLICATIONS

The present application is related to commonly owned, co-pending patent application Ser. No. 11/111,411 entitled "DISK DRIVE ADJUSTING OPERATING MODE BASED ON HISTORICAL PROXIMITY OF HOST COMMANDS" the disclosure of which is incorporated herein by reference.

BACKGROUND

1. Field

The present invention relates to disk drives for computer systems. In particular, the present invention relates to a disk drive adjusting predictive caching based on the temperature of the voice coil motor.

2. Description of the Related Art

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track.

In order to avoid the mechanical latency associated with seeking the head to a target track, prior art disk drives typically implement "predictive caching" wherein a number of data sectors proximate the data sectors of a read command are cached, such as data sectors preceding the read command (pre-read data sectors) and/or data sectors following the read command (post-read data sectors). In this manner, if a subsequent read command received from a host requests the data sectors that are already cached, the data sectors can be read immediately from the cache memory thereby avoiding the mechanical latency of the seek operation.

Prior art disk drives also typically implement a rotational position optimization (RPO) algorithm for selecting from a command queue the next access command to execute in an order that minimizes rotational latency. That is, the commands in the command queue are evaluated to determine the amount of seek latency required to seek the head to the target track, as well as the rotational latency for the head to reach the first target data sector. When predictive caching is enabled, and a read command selected from the command queue has additional rotational latency beyond that required to perform the seek, the additional rotational latency is used to cache additional data sectors (pre-read and/or post-read data sectors).

The prior art has also suggested to adjust the seek times to prevent the VCM from overheating, which may cause the material molded over the voice coil to delaminate, lose its rigidity, and/or outgas particles that may contaminate the disk. Overheating the VCM may also degrade the strength of the fixed magnets that interact with the magnetic flux generated by the voice coil. As the temperature of the VCM rises, and the seek times are lengthened, the RPO algorithm is modified accordingly. The prior art teaches to adjust the seek times so that the VCM temperature remains just under a predetermined threshold, that is, to minimize the seek time relative to temperature. However, operating the VCM near its temperature threshold may degrade performance since it may preclude the RPO algorithm from selecting the most optimal access command from the command queue (i.e., the nearest access command but for the VCM temperature being too high), or selecting a command from the command queue that requires an additional revolution of latency due to missing the first target data sector (because the VCM temperature is too high).

There is, therefore, a need to compensate for VCM temperature in a disk drive so as to improve overall performance.

SUMMARY OF THE EMBODIMENTS OF THE INVENTION

An embodiment of the present invention comprises a disk drive including a disk having a plurality of tracks, wherein each track comprises a plurality of data sectors. The disk drive further comprises a head coupled to a distal end of an actuator arm, and a voice coil motor (VCM) comprising a voice coil for rotating the actuator arm about a pivot. A read command is selected from a command queue, wherein the read command comprises a requested data sector. A maximum number of additional data sectors is determined that may be cached together with the requested data sector. An actual number of additional data sectors to cache is selected in response to the maximum number and a temperature of the voice coil.

In one embodiment, the disk drive is configured into a predictive caching mode to cache additional data sectors associated with read commands.

In another embodiment, the head seeks to a target track of the selected read command according to a seek profile determined in response to the selected additional data sectors.

In one embodiment, the additional data sectors comprise post-read data sectors associated with a previous read command, and in another embodiment, the additional data sectors comprise pre-read data sectors associated with the selected read command.

In yet another embodiment, the selected number of additional data sectors is incrementally less than the maximum number as the voice coil temperature increases, and in one embodiment, the selected number of additional data sectors is zero when the voice coil temperature exceeds a threshold.

In still another embodiment, the additional data sectors are selected to cache in response to the maximum number, the temperature of the voice coil, and a seek length associated with the selected read command.

In another embodiment, each track comprises a plurality of servo sectors, and the maximum number of additional data sectors that may be cached is determined relative to the servo sectors.

Another embodiment of the present invention comprises a method of operating a disk drive, the disk drive comprising a disk having a plurality of tracks, wherein each track comprises a plurality of data sectors. The disk drive further comprises a head coupled to a distal end of an actuator arm, and a voice coil motor (VCM) comprising a voice coil for rotating the actuator arm about a pivot. A read command is selected from a command queue, wherein the read command comprises a requested data sector. A maximum number of additional data sectors is determined that may be cached together with the requested data sector. An actual number of additional data sectors to cache is selected in response to the maximum number and a temperature of the voice coil.

DETAILED DESCRIPTION OF EMBODIMENTS OF THE INVENTION

Figures 1A, 1B:
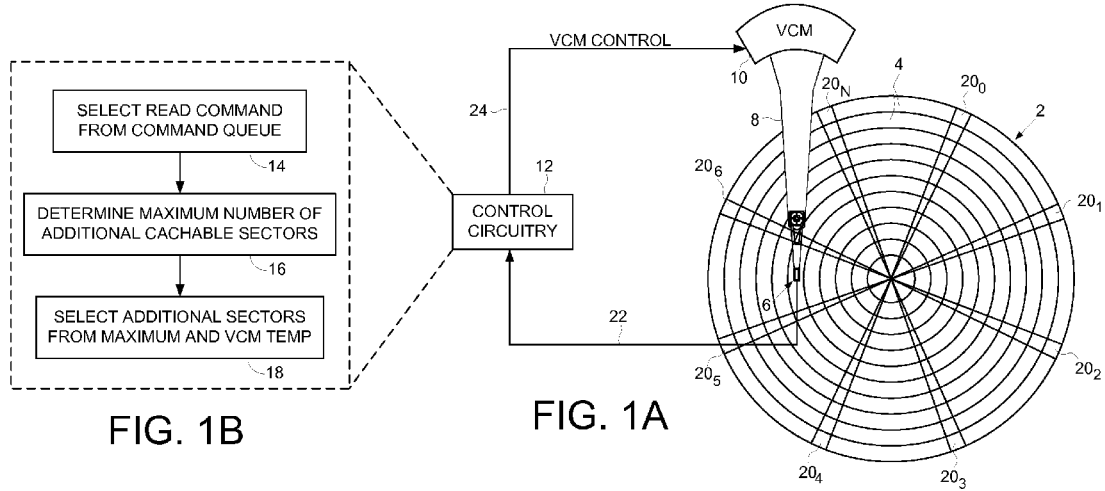
FIG. 1A shows a disk drive according to an embodiment of the present invention comprising a disk, a head actuated over the disk, and control circuitry.
FIG. 1B is a flow diagram executed by the control circuitry according to an embodiment of the present invention wherein after selecting a read command from a command queue, an additional number of data sectors to cache is selected in response to a maximum number of cacheable data sectors and a temperature of the VCM.

FIG. 1A shows a disk drive according to an embodiment of the present invention including a disk 2 having a plurality of tracks 4, wherein each track comprises a plurality of data sectors. The disk drive further comprises a head 6 coupled to a distal end of an actuator arm 8, and a voice coil motor (VCM) 10 comprising a voice coil for rotating the actuator arm 8 about a pivot. Control circuitry 12 executes the flow diagram of FIG. 1B wherein a read command is selected from a command queue (step 14), the read command comprising a requested data sector. A maximum number of additional data sectors is determined (step 16) that may be cached together with the requested data sector. An actual number of additional data sectors to cache is selected in response to the maximum number and a temperature of the voice coil (step 18).

In the embodiment of FIG. 1A, the disk 2 comprises a plurality of embedded servo sectors $20_0$-$20_N$ that define the plurality of data tracks 4. The control circuitry 12 processes the read signal 22 emanating from the head 6 to demodulate the information in the embedded servo sectors $20_0$-$20_N$. The demodulated servo information (position error signal) is then processed (e.g., using appropriate compensation filtering) to generate a position control signal 24 applied to the VCM 10 in order to position the head 6 over a target data track (seek to the target data track and track the centerline of the target data track).

In one embodiment, the control circuitry 12 configures the disk drive into a predictive caching mode to cache additional data sectors associated with read commands. For example, in one embodiment the control circuitry 12 evaluates the historical proximity of host commands to determine whether caching additional data sectors will improve performance of the disk drive, or if caching should be disabled to save power and reduce VCM heating. More details of this embodiment are disclosed in the above-referenced co-pending patent application entitled "DISK DRIVE ADJUSTING OPERATING MODE BASED ON HISTORICAL PROXIMITY OF HOST COMMANDS".

Figure 2A:
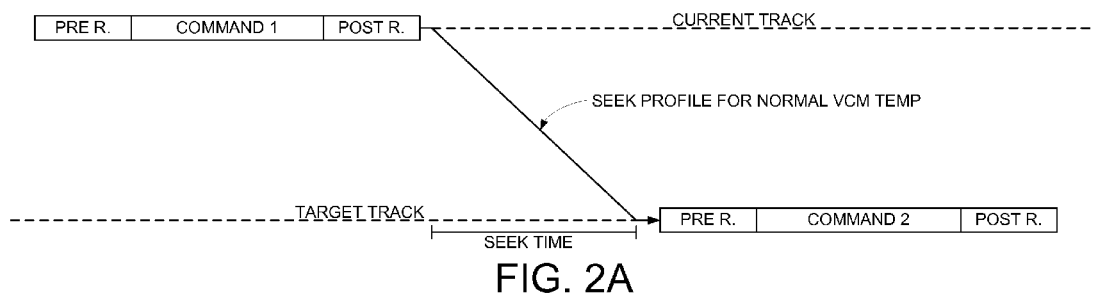
FIG. 2A illustrates an embodiment of the present invention wherein the maximum number of cacheable data sectors are selected for caching for a normal VCM temperature.

FIG. 2A illustrates an embodiment of the present invention including the seek profile used when the VCM is at a normal operating temperature. After processing a first read command COMMAND_1, the RPO algorithm selects a second read command COMMAND_2. Prior to initiating the seek to the target track of COMMAND_2, a number of post-read data sectors associated with the end of COMMAND_1 are read and stored in a cache memory. The seek operation then seeks the head to the target track of COMMAND_2 according to a seek profile that ensures the head reaches the target track early, thereby enabling a number of pre-read data sectors associated with the beginning of COMMAND_2 to be read and stored in the cache memory.

Figure 2B:
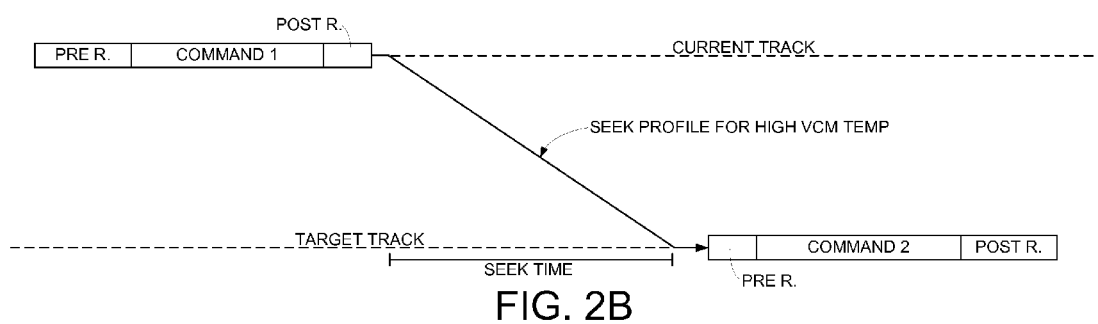
FIG. 2B illustrates an embodiment of the present invention wherein less than the maximum number of cacheable data sectors are selected for a high VCM temperature.

FIG. 2B illustrates an embodiment of the present invention including the adjusted seek profile used when the VCM is operating at a high temperature. After COMMAND_2 is selected by the RPO algorithm, the control circuitry evaluates the maximum number of cacheable data sectors and adjusts the actual number of additional data sectors relative to the temperature of the VCM. In the embodiment shown in FIG. 2B, the number of post-read and pre-read data sectors are reduced in a substantially equal proportion to allow for a less aggressive seek profile which helps reduce the VCM temperature. However, any proportion of post-read and pre-read data sectors may be reduced, including to reduce only the post-read data sectors or to reduce only the pre-read data sectors. In one embodiment, the control circuitry may detect various modes of operation wherein caching either of the post-read or pre-read data sectors provides better performance, and therefore the post-read and pre-read data sectors selected for caching are reduced accordingly in response to the voice coil temperature.

Figure 3:
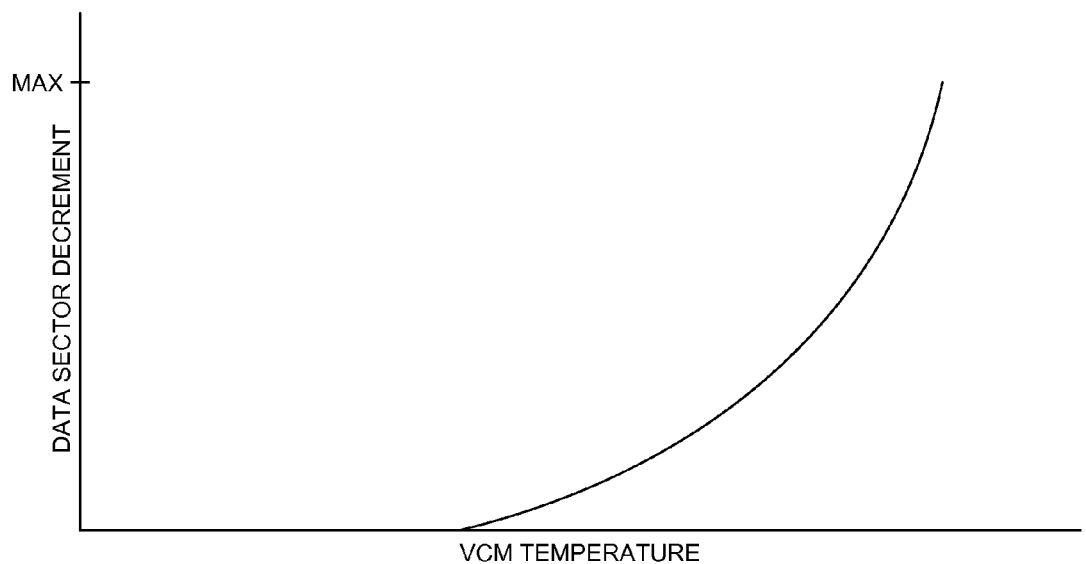
FIG. 3 is a graph according to an embodiment of the present invention wherein the number of additional data sectors selected for caching decreases as the temperature of the VCM increases.

FIG. 3 is a graph according to an embodiment of the present invention illustrating an example of how the additional number of data sectors selected for caching may decrease as the voice coil temperature increases. As shown in FIG. 3, the number of additional data sectors is not reduced until the voice coil temperature reaches a threshold, and then the number of additional data sectors is decremented as the voice coil temperature exceeds the threshold until eventually zero additional data sectors are selected for caching (when the number decremented equals the maximum). Alternatively to the example shown in FIG. 3, other relationships may be used, such as a linear relationship.

Figure 4:
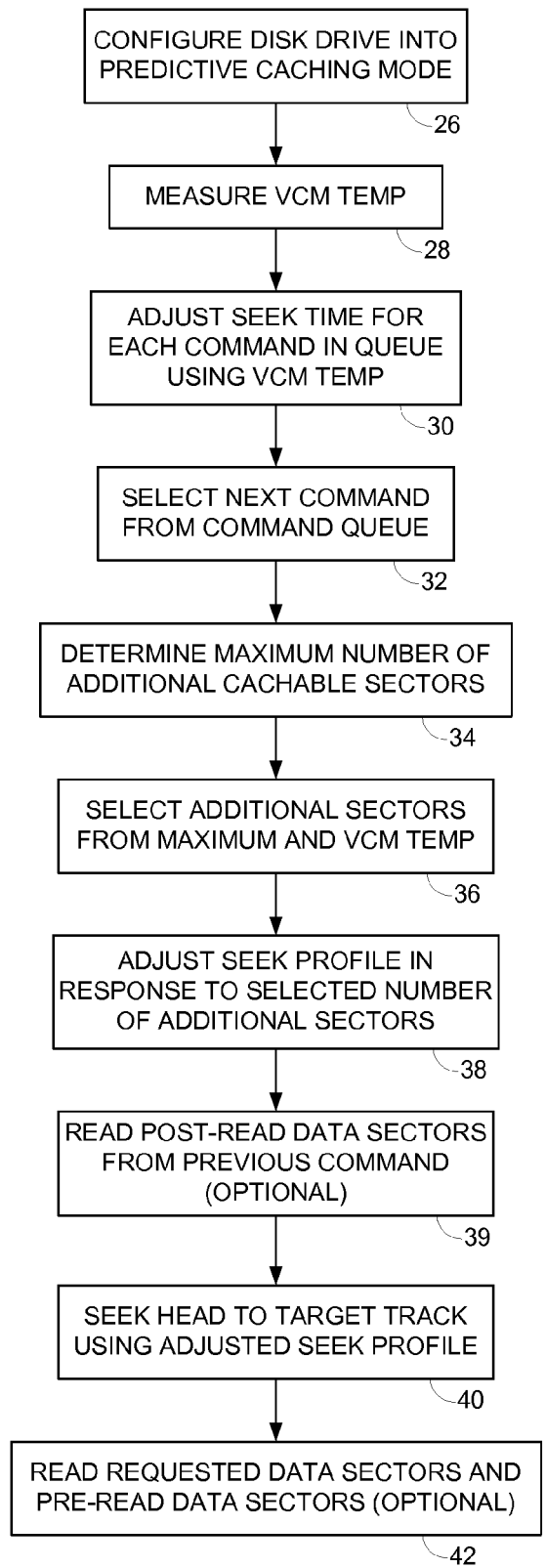
FIG. 4 is a flow diagram executed by the control circuitry according to an embodiment of the present invention wherein the seek times for the RPO algorithm are adjusted in response to the VCM temperature.

FIG. 4 is a flow diagram according to an embodiment of the present invention that may be executed by the control circuitry 12. Optionally, the disk drive may be configured into a predictive caching mode (step 26) based on any suitable criteria, such as the historical proximity of host commands as disclosed in the above-referenced patent application. The temperature of the voice coil is measured (step 28) and the seek time is adjusted for each command in the command queue based on the voice coil temperature (step 30). For example, in one embodiment the seek times are adjusted to ensure that the voice coil temperature does not exceed a maximum threshold during the next seek operation. A next command is selected from the command queue based on a rotational position optimization (RPO) algorithm (step 32), wherein if the next command is a read command, a maximum number of additional cacheable data sectors is determined (step 34) which is related to the rotational latency of the selected command. That is, if the seek operation were performed according to the shortest seek time that still prevents the voice coil from overheating (step 30), a maximum number of additional data sectors (post-read and/or pre-read) would be cacheable in that all of rotational latency of the selected command would be used for predictive caching (FIG. 2A). However, in order to keep the voice coil temperature below the maximum threshold, an actual number of data sectors to cache is selected in response to the maximum number and the voice coil temperature (step 36). The higher the voice coil temperature, the fewer number of data sectors selected for caching (FIG. 3). The seek profile is then adjusted (step 38) in response to the selected number of data sectors to cache so that the seek may be performed according to a less aggressive seek profile (FIG. 2B). If the additional data sectors selected for caching include post-read data sectors of a previous read command, then the post-read data sectors are read (step 39). A seek operation is then performed using the adjusted seek profile to position the head over the target track of the read command (step 40), and the data sectors requested in the read command are read (step 42) together with the pre-read data sectors (if selected).

Figure 5:
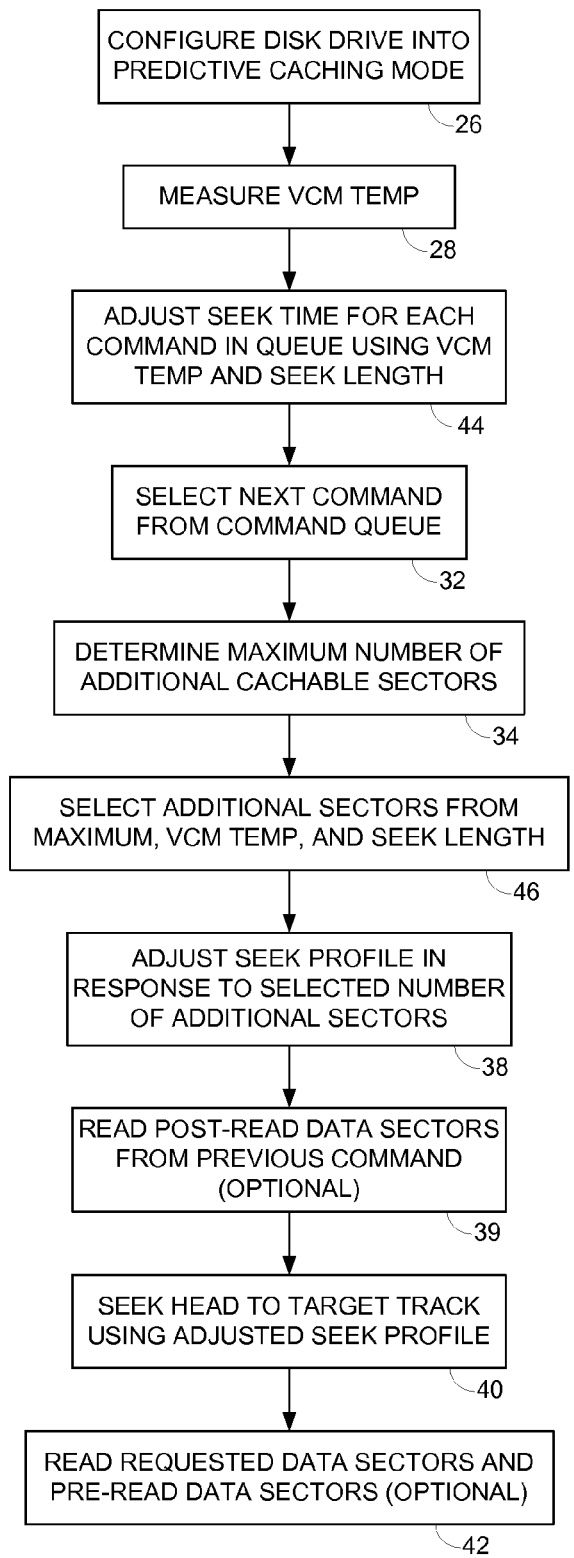
FIG. 5 is a flow diagram executed by the control circuitry according to an embodiment of the present invention wherein the additional data sectors are selected for caching in response to the maximum number, the VCM temperature, and a seek length of the selected read command.
Figure 6:
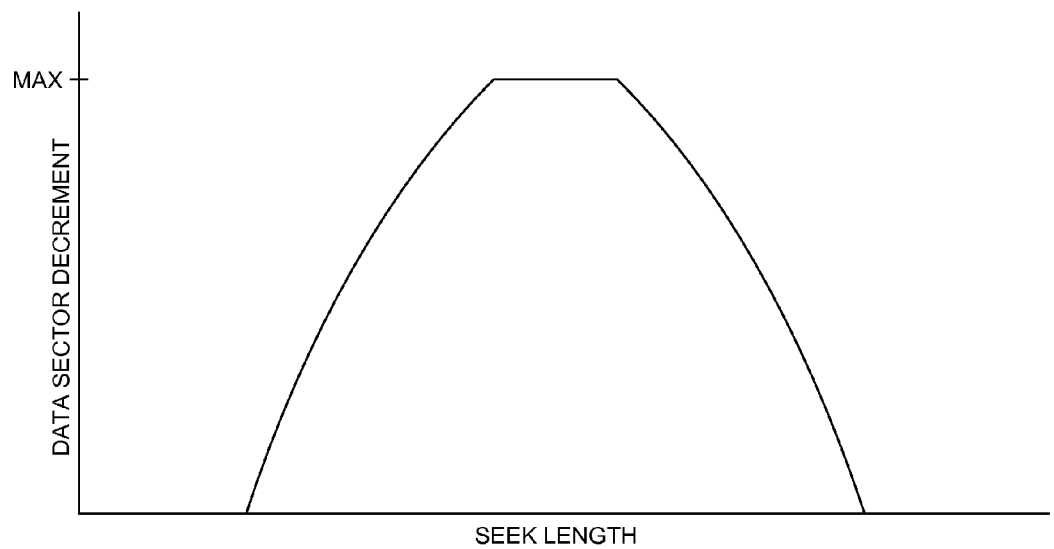
FIG. 6 is a graph according to an embodiment of the present invention wherein the number of additional data sectors selected for caching decreases and then increases as the seek length increases.

FIG. 5 is a flow diagram according to an embodiment of the present invention that may be executed by the control circuitry 12. The flow diagram of FIG. 5 extends the flow diagram of FIG. 4 in that the seek time is adjusted for each command in the command queue in response to the voice coil temperature as well as a seek length for each command (step 44). Similarly, the seek profile may be adjusted for a selected read command in response to the voice coil temperature and the seek length for the read command (step 46). The voice coil temperature is affected by the seek length due mainly to the acceleration and deceleration phases of the seek operation. For short seek lengths, the acceleration and deceleration phases may not be long enough to significantly affect the voice coil temperature. As shown in the example in FIG. 6, when the seek length exceeds a first threshold, the acceleration and deceleration phases may be long enough to affect the voice coil temperature, and therefore the number of additional data sectors to cache is decreased. When the seek length increases past a second threshold, the coast phase of the seek operation allows the voice coil to cool, thereby allowing more data sectors to be cached for longer seeks.

The voice coil temperature may be measured in any suitable manner, such as a direct measurement using a suitable temperature sensor (e.g., a suitable thermistor). In other embodiments, the voice coil temperature may be measured indirectly, for example, by evaluating the amount of current applied to the voice coil, or by measuring certain performance characteristics of the VCM 10 as in the embodiments disclosed in U.S. Pat. No. 6,369,972 the disclosure of which is incorporated herein by reference.

The maximum number of cacheable data sectors as well as the selected number of data sectors to cache for a read command may be determined in any suitable manner. In one embodiment, the maximum number of cacheable data sectors is determined relative to a number of servo sectors that will pass under the head during the rotational latency of a seek operation. The actual number of data sectors selected for caching is then selected relative to the maximum number of servo sectors. For example, if a seek operation is performed according to an aggressive seek profile (FIG. 2A) a maximum number of servo sectors may pass under the head during the rotation latency of the seek operation (post-read and/or pre-read). Between two consecutive servo sectors (referred to as a servo wedge) there is recorded a number of data sectors. In an embodiment employing zoned recording, wherein the data rate is increased from the inner to outer zones, the number of data sectors per servo wedge may vary. In one embodiment, the actual number of data sectors to cache may be selected by reducing the number of servo wedges allocated to the rotational latency. For example, if a seek operation is performed according to an aggressive seek profile (FIG. 2A) 10 servo wedges worth of additional data sectors may be cached. However, if the voice coil temperature and/or the seek length indicates that less data sectors should be cached, then a fewer number of servo wedges (e.g., 9 or less) may be selected for caching the additional data sectors.

As will be appreciated by one of ordinary skill in the art, the steps outlined in FIGS. 1B, 4, and 5 may be performed in an order that differs from the order in these exemplary figures. Also, certain steps may be omitted without departing from the spirit and scope of the present invention.

Any suitable control circuitry 12 may be employed in the embodiments of the present invention, such as any suitable integrated circuit or circuits. For example, the control circuitry 12 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or a system on a chip (SOC). In addition, the control circuitry may include a suitable preamp circuit implemented as a separate integrated circuit, integrated into the read channel or disk controller circuit, or integrated into an SOC.

In one embodiment, the control circuitry 12 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in an SOC. In another embodiment, the instructions are stored on the disk 2 and read into a volatile semiconductor memory when the disk drive is powered on. In yet another embodiment, the control circuitry 12 comprises suitable logic circuitry, such as state machine circuitry.

What is claimed is:

1. A disk drive comprising:
   a disk comprising a plurality of tracks, wherein each track comprises a plurality of data sectors;
   a head coupled to a distal end of an actuator arm;
   a voice coil motor (VCM) comprising a voice coil for rotating the actuator arm about a pivot; and
   control circuitry operable to:
   select a read command from a command queue, the read command comprising a requested data sector;
   determine a maximum number of additional data sectors that may be cached together with the requested data sector; and
   select additional data sectors to cache in response to the maximum number and a temperature of the voice coil.

2. The disk drive as recited in claim 1, wherein the control circuitry is further operable to configure the disk drive into a predictive caching mode to cache additional data sectors associated with read commands.

3. The disk drive as recited in claim 1, wherein the control circuitry is further operable to seek the head to a target track of the selected read command according to a seek profile determined in response to the selected additional data sectors.

4. The disk drive as recited in claim 1, wherein the additional data sectors comprise post-read data sectors associated with a previous read command.

5. The disk drive as recited in claim 1, wherein the additional data sectors comprise pre-read data sectors associated with the selected read command.

6. The disk drive as recited in claim 1, wherein the selected number of additional data sectors is incrementally less than the maximum number as the voice coil temperature increases.

7. The disk drive as recited in claim 6, wherein the selected number of additional data sectors is zero when the voice coil temperature exceeds a threshold.

8. The disk drive as recited in claim 1, wherein the control circuitry is further operable to select the additional data sectors to cache in response to the maximum number, the temperature of the voice coil, and a seek length associated with the selected read command.

9. The disk drive as recited in claim 1, wherein:
each track comprises a plurality of servo sectors; and
the maximum number of additional data sectors that may be cached is determined relative to the servo sectors.

10. A method of operating a disk drive, the disk drive comprising a disk comprising a plurality of tracks, wherein each track comprises a plurality of data sectors, a head coupled to a distal end of an actuator arm, and a voice coil motor (VCM) comprising a voice coil for rotating the actuator arm about a pivot, the method comprising:
selecting a read command from a command queue, the read command comprising a requested data sector;
determining a maximum number of additional data sectors that may be cached together with the requested data sector; and
selecting the additional data sectors to cache in response to the maximum number and a temperature of the voice coil.

11. The method as recited in claim 10, further comprising configuring the disk drive into a predictive caching mode to cache additional data sectors associated with read commands.

12. The method as recited in claim 10, further comprising seeking the head to a target track of the selected read command according to a seek profile determined in response to the selected additional data sectors.

13. The method as recited in claim 10, wherein the additional data sectors comprise post-read data sectors associated with a previous read command.

14. The method as recited in claim 10, wherein the additional data sectors comprise pre-read data sectors associated with the selected read command.

15. The method as recited in claim 10, wherein the selected number of additional data sectors is incrementally less than the maximum number as the voice coil temperature increases.

16. The method as recited in claim 15, wherein the selected number of additional data sectors is zero when the voice coil temperature exceeds a threshold.

17. The method as recited in claim 10, wherein the control circuitry is further operable to select the additional data sectors to cache in response to the maximum number, the temperature of the voice coil, and a seek length associated with the selected read command.

18. The method as recited in claim 10, wherein:
each track comprises a plurality of servo sectors; and
the maximum number of additional data sectors that may be cached is determined relative to the servo sectors.

19. A disk drive comprising:
a disk comprising a plurality of tracks, wherein each track comprises a plurality of data sectors;
a head coupled to a distal end of an actuator arm;
a voice coil motor (VCM) comprising a voice coil for rotating the actuator arm about a pivot; and
a means for selecting a read command from a command queue, the read command comprising a requested data sector;
a means for determining a maximum number of additional data sectors that may be cached together with the requested data sector; and
a means for selecting the additional data sectors to cache in response to the maximum number and a temperature of the voice coil.

* * * * *